May 31, 1949.    C. N. HICKMAN    2,471,745
SPACER TRAP FOR ROCKETS
Filed March 21, 1946
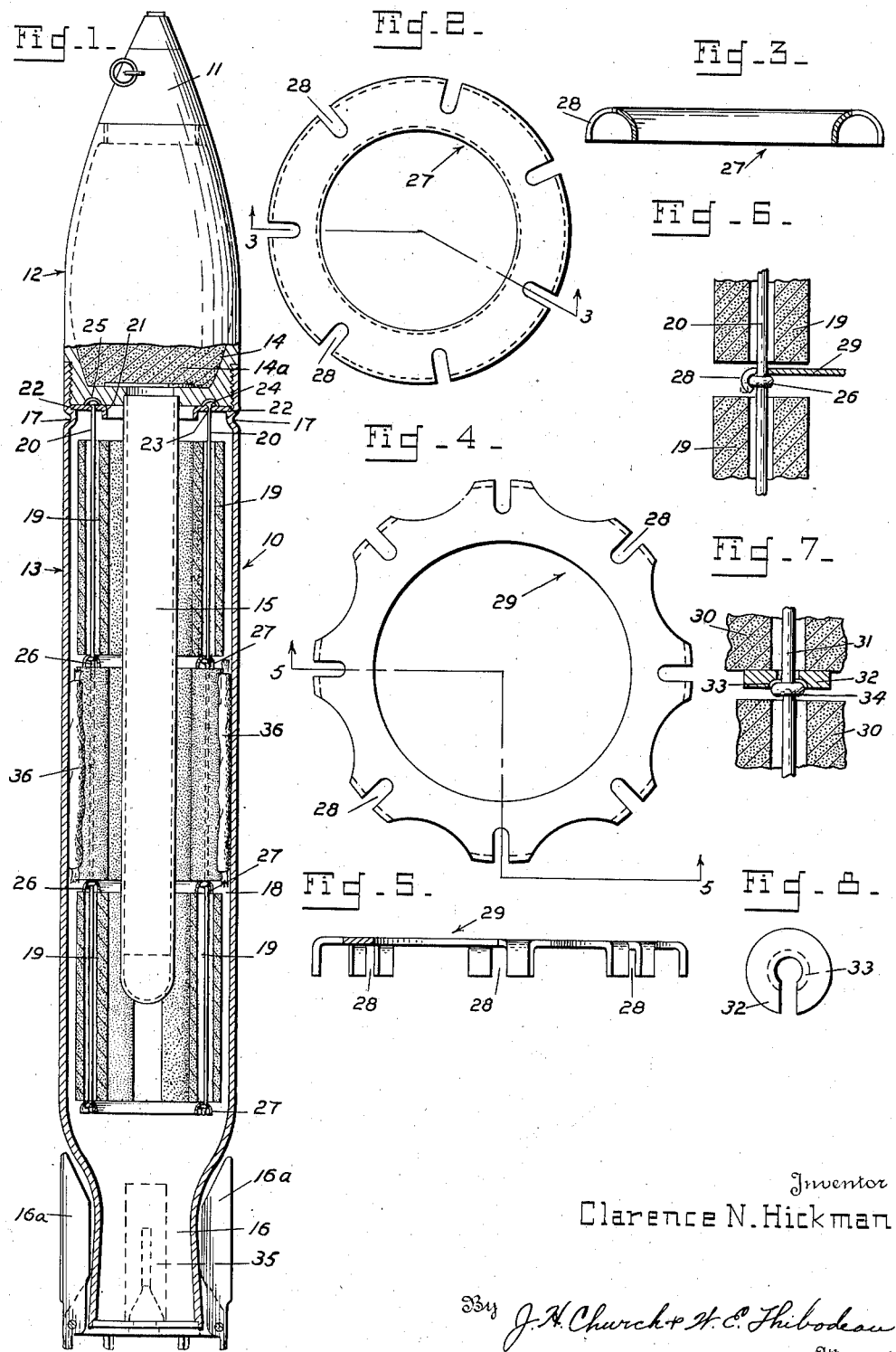
Inventor
Clarence N. Hickman
By J. H. Church & H. E. Thibodeau
Attorneys Patented May 31, 1949

2,471,745

UNITED STATES PATENT OFFICE 2,471,745

SPACER TRAP FOR ROCKETS

Clarence N. Hickman, Jackson Heights, N. Y., assignor to the United States of America as represented by the Secretary of War Application March 21, 1946, Serial No. 656,118

6 Claims. (Cl. 60—35.6)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to rocket projectiles and more particularly to an improved method for supporting and trapping propellent powder grains within rocket motors.

It is a principal object of this invention to provide an improved powder supporting and separating means for use with trap wire assemblies which will give venting space between the grains and at the same time transfer the drag and setback forces on each grain directly to the trap wire upon which it is strung instead of down the column of powder.

Another object of this invention is to provide a powder trapping device which strengthens and holds together a cage type multiple wire powder trapping assembly, and which is easily assembled with and on the said multiple wire trapping means.

A still further object of the invention is to provide a relatively simple powder spacing trap device which is locked in its proper position on a trap wire or rod throughout the burning of the propellent grains and the forward acceleration of the rocket motor resulting therefrom.

Additional objects, advantages and features of invention reside in the construction, arrangement and combination of parts involved in the embodiment of the invention, as will be understood from the following description and accompanying drawing, forming part of the specification, wherein similar numbers are used to designate like parts throughout the specification and drawing.

In the drawing:

Figure 1 is a partial longitudinal section of a rocket projectile provided with a trap assembly constructed in accordance with my invention, Figure 2 is an enlarged plan view of one of the spacer trap washers shown in Figure 1, Figure 3 is a transverse section of a spacer trap washer taken on the line 3—3 of Figure 2, Figure 4 is a plan view of a modified form of the spacer trap washer shown in Figure 2, Figure 5 is a transverse section of the modified trap washer, taken on the line 5—5 of Figure 4, Figure 6 is a partial longitudinal section through the ends of adjacent powder grains strung on the same wire, illustrating the embodiment of the modified form of trap washer in the trap assembly, Figure 7 is a longitudinal view, partly in section, of a modified form of trap washer for use with a single trap wire, and, Figure 8 is a plan view of the trap washer shown in Figure 7.

Referring to the drawing and particularly to Figure 1, the numeral 10 designates generally an assembled rocket projectile having a fuze 11, a shell 12, and a motor body 13. The shell 12 includes a hollow body 14 and a burster tube 15, both of which are filled with a high explosive bursting charge 14a which is detonated by the fuze 11. The motor body 13 consists of hollow steel tube which is constricted near its rearward or tail end to form a nozzle 16 through which the propellent gases from within the motor body are discharged at a relatively high velocity to propel the rocket forwardly toward the object at which it is aimed. The said motor body is internally threaded at its forward end for the reception of the correspondingly threaded rearward end of the shell 12, and an annular safety groove 17 is provided near its forward end to permit it to separate at a definite point should an excessive pressure be generated within the said motor body upon firing. The nozzle portion 16 may be arranged for the attachment of folding fins 16a to stabilize the rocket in flight. An electrically controlled igniter 35 and igniter bags 36 are provided for igniting the propellent charge.

The propellent charge is secured within a motor chamber 18 formed by the walls of the said motor body 13. It consists of a plurality of cylindrical powder grains 19 which are strung on a plurality of trap rods or wires 20 suspended from a trap washer 21 which rests on an annular shoulder 22 formed about inner circumference of the motor chamber 18. The trap washer 21 is provided with a plurality of openings 23 large enough to permit passage of the trap rods 20 but which will retain the beaded heads 24 formed on the said trap rods, the said openings being so arranged that the suspended rods form a cylindrical cage. An annular groove 25 is provided in the base of the shell 12 to receive the beaded heads 24 when the shell is attached to the motor body.

The trap wires 20 are upset along their lengths at points between the ends of adjacent powder grains 19 and at the bottom of the lowest powder grains, to form flanges or nubs 26. Spacer trap washers or ring members 27 are assembled over the nubs 26 to space the powder grains 19 from each other. The outer edges of the ring member 27 are turned rearwardly to the plane of the washer to engage the outer portion of the nubs 26, thereby providing retaining means for preventing the trap wires 20 from moving radially outward and away from the ring member 27 after the trap and powder grains are assembled. The ring members are also provided with a plurality of radial slots 28 extending inward from the outer periphery and having a width such that the slot will receive the normal diameter of the trap wires 20 but will not allow the nubs 26 to pass therethrough. The cross-section of the washer 27 may be "C" shaped, as shown in Figure 3. In other words, the ring may be in the form of half a hollow tore divided normally to its axis of generation.

The modified spacer washer 29 shown in Figures 4, 5 and 6 is generally similar to the washer 27 except that portions of the outer edge have been cut away to provide a washer of lesser weight. The outer turned edges of washer 29 interlock with nubs 26 on the trap wires 20 in the manner shown in the construction illustrated in Figure 6, to prevent separation of the trap wires 20 from the washers during the burning of the powder grains 19.

The modification shown in Figures 7 and 8 are primarily intended for use when the propellant may take the form of larger diametered powder grains 30 strung on a single trap wire 31. A slotted spacer washer 32 having an annular recess 33 in its rearward face engages the nub 34 and is locked in place on the said trap wire by the pressure of the powder grain 30 and the flowing of combustion gases thereagainst during acceleration of the rocket.

In the construction illustrated and described herein, each individual powder grain is positively supported against rearward movement with respect to the trap wires during acceleration of the rocket due to the burning of the grains. Likewise, the individual grains are spaced from each other by the novel trap members disclosed. The edge construction of the ring members 27 and 29, and the annular recess in the member 32, are provided to prevent the said members from becoming detached or separated from the nubs formed on the trap wires during the burning of the powder grains, and the said members 27, 29 and 32 are not large enough to impede the flow of combustion gases to the nozzle of the rocket. It has been found that the use of the improved spacer trap construction herein disclosed results in relatively easy assembly of the powder grains on the trap wires, and in improved motor performance.

It will be understood that, in all species, the maximum diameter of nubs or flanges 34 is a little less than the diameter of the axial holes through the powder grains, so that assembly is effected by stringing the grains onto the respective wires and then inserting a ring member or washer, such as 27, behind each set of grains until each trap wire is received in its corresponding slot. The entire trap and propellant assembly is then inserted into tube 13 until washer 21 rests upon shoulder 22. Thereafter, the fuze and burster tube assembly may be screwed into place to hold the trap and propellant grains in position in the tube.

The form of my invention herewith shown and described is to be taken as a preferred example of the same, and various changes in the shape, size and arrangement of parts may be resorted to without departing from the spirit of the invention or the scope of the subjoined claims.

Having thus described the invention, I claim:

1. In a rocket motor assembly having powder grains strung on a trap wire, the said trap wire being provided with a plurality of spaced nubs intermediate its ends, a spacer member for positioning on said wire between the ends of said grains, said spacer member having a slot therein to receive said trap wire and having retaining means adjacent said slot to engage with a nub on the said trap wire.

2. In a rocket motor assembly having powder grains strung on a plurality of trap wires, each of the said trap wires being provided with a plurality of spaced nubs intermediate its ends, a spacer member for positioning on the said trap wires between the ends of the said powder grains, said spacer member having a plurality of slots therein to receive the said trap wires respectively between a nub and the adjacent rearward end of a corresponding powder grain, the outer edge of the said spacer member being turned rearwardly along said trap wires for engagement with the nubs thereon.

3. In a rocket motor assembly having powder grains strung on a plurality of trap wires, each of the said trap wires being provided with a plurality of spaced nubs intermediate its ends, a ring shaped spacer member for positioning on said wires between the ends of the said powder grains, said member having radial slots extending inward from its outer edge to receive said trap wires, the outer edge of said spacer member being turned rearward of the plane of said member for engagement with the nubs on said wire.

4. In a rocket motor, means forming a generally cylindrical motor chamber, a plurality of powder grains in said chamber, a trap wire extending longitudinally through said chamber passing through axially extending holes in said grains, a plurality of spaced nubs fixed on said wire, a plurality of washers each having a slot embracing said wire and of less width than said nubs, each washer being interposed between a nub and the rear end of a respective powder grain whereby each grain is individually supported on said wire by its washer, each said washer having a recess therein on its rear side extending about the closed end of the slot therein, each nub fitting within a respective recess to thereby lock each washer against laterally displacement relatively to said wire.

5. A rocket motor comprising means forming a generally cylindrical combustion chamber, a plurality of circumferentially spaced trap wires extending longitudinally through said chamber, each said wire having a plurality of spaced flanges fixed thereon, means fixing each wire at its forward end in said chamber, each flange being in substantially the same plane transversely of said wires with a corresponding flange on each of the remaining said wires, a plurality of propelling powder grains on each said wire, and a plurality of washers each having radial angularly-spaced slots therein of less width than the diameter of said flanges, each slot embracing a respective wire between a flange and the adjacent rearward end of a powder grain whereby each said powder grain is supported on a flange through the intermediary of its washer, each slot in each washer terminating in a rearwardly-turned edge whereby, when a washer is resting on its flanges, radial movement of a wire out of its slot, is prevented by said edges.

6. A rocket motor comprising means forming a generally cylindrical combustion chamber, a plurality of circumferentially spaced trap wires extending longitudinally through said chamber, each said wire having a plurality of spaced flanges fixed thereon, means fixing each wire at its forward end in said chamber, each flange being in substantially the same plane transversely of said wires with a corresponding flange on each of the remaining said wires, a plurality of propelling powder grains on each said wire, and a plurality of washers each having radial angularly-spaced slots therein of less width than the diameter of said flanges, each slot embracing a respective wire between a flange and the adjacent rearward end of a powder grain whereby each said powder grain is supported on a flange through the intermediary of its washer, each said washer being in the form of half a hollow tore divided normally to its generating axis.

CLARENCE N. HICKMAN.

REFERENCES CITED

The following references are of record in the file of this patent:

UNITED STATES PATENTS

| Number | Name | Date |
|---|---|---|
| 2,404,190 | Pope | July 16, 1946 |
| 2,405,415 | Eksergian | Aug. 6, 1946 |